US007894714B2

(12) United States Patent
Sasaki

(10) Patent No.: US 7,894,714 B2

(45) Date of Patent: Feb. 22, 2011

(54) LENS ASSEMBLY AND IMAGING APPARATUS

(75) Inventor: Naoki Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 164 days.

(21) Appl. No.: 12/395,901

(22) Filed: Mar. 2, 2009

(65) Prior Publication Data

US 2009/0245766 A1 Oct. 1, 2009

(30) Foreign Application Priority Data

Mar. 28, 2008 (JP) .......................... P2008-088517

(51) Int. Cl.
*G03B 17/08* (2006.01)

(52) U.S. Cl. ........................................ 396/25; 396/529

(58) Field of Classification Search .................. 396/25, 396/29, 529; 359/513, 829, 830
See application file for complete search history.

(56) References Cited

U.S. PATENT DOCUMENTS 3,640,424 A * 2/1972 Ando ........................ 220/288
5,212,509 A * 5/1993 Kosako et al. ................ 396/29
6,507,700 B1 1/2003 Takekuma et al.
7,660,057 B2 * 2/2010 Sasaki et al. ................ 359/825
7,751,136 B2 * 7/2010 Sasaki ........................ 359/830
7,791,828 B2 * 9/2010 Sasaki ........................ 359/830

FOREIGN PATENT DOCUMENTS

JP 2002-90603 A 3/2002

* cited by examiner

*Primary Examiner*—W. B. Perkey
(74) *Attorney, Agent, or Firm*—Birch, Stewart, Kolasch & Birch, LLP

(57) ABSTRACT

Taking lenses 11_4, 11_3, and 11_2 are housed in a lens frame 12. Then, the O-ring 13 is fitted into a groove **11_1*a* provided on the periphery of the taking lens 11_1, and the taking lens 11_1 is housed in the lens frame 12. Subsequently, an anterior surface 14*b* of a lens holder 14 in a screwing direction (directions of arrows P and P') comes into contact with a wall surface 12*b* of the lens frame 12. Then, the lens holder 14 is gradually screwed into the lens frame 12. Thereby, a deformable portion 12*c* of the lens frame 12 on an O-ring 13 side of the wall surface 12*b* is deformed in such a direction (directions of arrows Q and Q') as to press the O-ring 13**.

6 Claims, 5 Drawing Sheets

10
11_1a 14b
Q
14a 14
12c
P
13
12a
12b
12
11_1
A
11_4
11_3
11_2
P'
Q'

LENS ASSEMBLY AND IMAGING APPARATUS

CROSS-REFERENCE TO RELATED APPLICATIONS

This application is based upon and claims the benefit of priority from the Japanese Patent Application No. 2008-88517 filed on Mar. 28, 2008; the entire contents of which are incorporated herein by reference.

BACKGROUND OF THE INVENTION

1. Technical Field

The invention relates to a lens assembly equipped with a lens for forming an image using subject light on an imaging device and to an imaging apparatus having the lens assembly.

2. Description of the Related Art

Recently, cameras become mounted in vehicles. Cameras provided in vehicles are used as surveillance cameras or as driving-assistance cameras. Since display screens have been provided on driver's seats as navigation systems have become popular, the latter case is intended to display an image taken by the camera on the display screen.

In such on-board cameras, most of those are required to have waterproof performance since those are mainly used outside of vehicles. In order to achieve sufficient waterproof performance without an increase in camera size in accordance with the requirement, it has been attempted to provide, in the on-board cameras, small-sized lens assemblies excellent in waterproof performance.

FIG. 5 is a view illustrating a section of a related-art lens assembly taken along an optical axis of a taking lens.

FIG. 5 shows a lens assembly 100 including a taking lens 101_1 of a first group, a taking lens 101_2 of a second group, a taking lens 101_3 of a third group, and a taking lens 101_4 of a fourth group in order from an incident side of subject light A. Furthermore, FIG. 5 shows a lens frame 102 housing these taking lenses 101_1, 101_2, 101_3, and 101_4 and an O-ring 103 disposed between a periphery of the taking lens 101_1 and an inner surface of the lens frame 102. Examples of a material of the O-ring 103 include an ethylene propylene based rubber, a silicon rubber, and the like.

Specifically, a groove 101_1*a* is provided on the periphery of the taking lens 101_1, and the O-ring 103 is fitted into the groove 101_1*a*. The O-ring 103 is disposed with being pressed by the inner surface, corresponding to the groove 101_1*a*, of the lens frame 102. The O-ring 103 is a rubber member which is adapted to exhibit waterproof performance after the taking lens 101_1 is housed in the lens frame 102. Furthermore, the lens assembly 100 actually includes a lens holder which is attached to the lens frame 102 and in which an imaging device is disposed. However, the lens holder is not shown in the figure.

Also, JP 2002-90603 A (corresponding to U.S. Pat. No. 6,507,700) has proposed a lens assembly in which a protrusion of a leading end of the lens frame is caulked on the front surface side of the taking lens in the way of thermal adhesion in a state where the O-ring disposed between the periphery of the taking lens and the inner surface of the lens frame is pressed, thereby securing waterproof performance between the taking lens and the lens frame.

In the related-art lens assembly shown in FIG. 5, the O-ring, which is fitted into the groove provided on the periphery of the taking lens, is pressed by the inner surface of the lens frame, thereby securing waterproof performance between the taking lens and the lens frame. Also, in the lens assembly described in JP 2002-90603 A, the protrusion of the leading end of the lens frame is caulked on the front surface side of the taking lens in the way of thermal adhesion in the state where the O-ring disposed between the periphery of the taking lens and the inner surface of the lens frame is pressed, thereby securing waterproof performance between the taking lens and the lens frame. As described above, in order to secure waterproof performance, the related-art lens assembly is configured so that the O-ring is pressed between the periphery of the taking lens and the inner surface of the lens frame.

However, in such a configuration, waterproof performance greatly depends on a mounting strength between the taking lens and the lens frame, which press the O-ring. Here, if variation occurs in mounting strength between the taking lens and the lens frame in the assembling process of the lens assembly, a problem arises in that variation occurs in waterproof performance. Furthermore, when the lens assembly is mounted on an on-board camera, if dimensions of the taking lens and the lens frame are varied with time, due to change of environmental conditions such as humidity and temperature, or the like, sometimes the mounting strength between the taking lens and the lens frame may deteriorate. In such a case, a problem arises in that waterproof performance deteriorates. Accordingly, the related-art lens assembly has a problem of low waterproof performance.

SUMMARY OF THE INVENTION

In view of the above circumstances, the invention provides a lens assembly that is improved in waterproof performance and an imaging apparatus.

According to an aspect of the invention, a lens assembly includes a lens, a lens frame, an O-ring and a lens holder. The lens frame houses the lens and is formed with a first screw on an outer peripheral surface thereof. The O-ring is disposed between a periphery of the lens and an inner surface of the lens frame. The lens holder is formed with a second screw on an inner wall surface thereof. The second screw is screwed with the first screw. The lens holder deforms the lens frame in such a direction as to press the O-ring, as the second screw of the lens holder is screwed with the first screw of the lens frame.

In this lens assembly, as the second screw formed on the inner wall surface of the lens holder is screwed into the first screw formed on the outer peripheral surface of the lens frame, the lens frame is deformed in such the direction as to press the O-ring. Thereby, the O-ring is sufficiently pressed. Thus, even if a mounting strength between the lens and the lens frame, which press the O-ring, is lowered in the assembling process, the O-ring is sufficiently pressed by the lens frame which is deformed by screwing the lens holder. Accordingly, it is possible to assemble the lens assembly improved in waterproof performance. Furthermore, in the case where the assembled lens assembly is mounted on an on-board camera, even if dimensions of the lens and the lens frame are varied with time, due to change of environmental conditions such as humidity and temperature, or the like, the O-ring is sufficiently pressed by the lens frame which is deformed by screwing the lens holder into. Thus, it is possible to maintain excellent waterproof performance.

Also, it is preferable that the lens frame includes a wall surface that is located closer, in a direction of an optical axis of the lens, to a side where the second screw of the lens holder is screwed into than a position where the O-ring is disposed, that the wall surface extends one step, in a direction orthogonal to the optical axis, toward the optical axis, and that when the second screw of the lens holder is screwed in the first screw of the lens frame, an anterior surface of the lens holder in a screwing direction presses the wall surface to deform, in such the direction as to press the O-ring, a part of the lens frame closer to the O-ring than the wall surface.

As described above, the anterior surface of the lens holder in the screwing direction presses the wall surface of the lens frame, thereby deforming the part of the lens frame on the O-ring side. Thus, it is possible to surely and sufficiently press the O-ring.

Also, it is preferable that the first screw is formed on the outer peripheral surface of the lens frame and in an area that is overlapped, in a direction orthogonal to an optical axis of the lens, with a position where the O-ring is disposed, and that the lens holder is formed with the second screw, which is screwed with the first screw and which is formed in a taper shape to deform the lens frame in such the direction as to press the O-ring as the second screw is screwed into the first screw.

In this manner, as the second screw, which has the taper shape and is formed in the lens holder, is screwed into the first screw formed on the outer peripheral surface of the lens frame, an inner diameter portion of the lens frame corresponding to the O-ring is deformed in such the direction as to press the O-ring. Thus, it is possible to sufficiently press the O-ring.

According to another aspect of the invention, an imaging apparatus includes the lens assembly described above, and an imaging device.

Since the above imaging apparatus includes the above-mentioned lens assembly, the imaging apparatus is improved in waterproof performance.

With the above configurations, it is possible to provide a lens assembly and an imaging apparatus improved in waterproof performance.

DETAILED DESCRIPTION OF EMBODIMENTS OF THE INVENTION

Hereinafter, embodiments of the invention will be described with reference to accompanying drawings.

Figure 1:
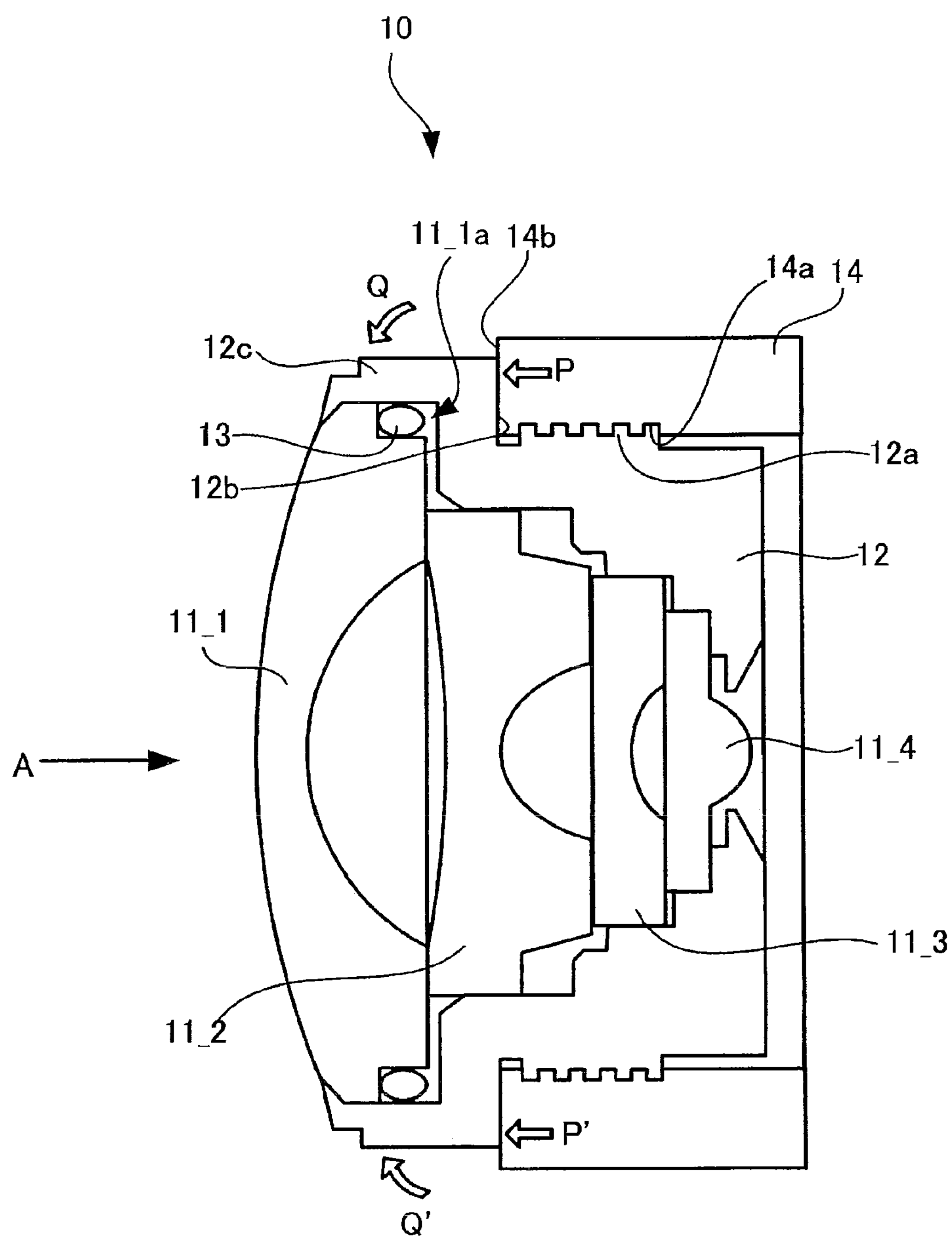
FIG. 1 is a view illustrating a section of a lens assembly according to a first embodiment of the invention, taken along an optical axis of a taking lens.

FIG. 1 is a view illustrating a section of a lens assembly according to a first embodiment of the invention, taken along an optical axis of a taking lens.

A lens assembly 10 according to the first embodiment shown in FIG. 1 includes a taking lens 11_1 of a first group, a taking lens 11_2 of a second group, a taking lens 11_3 of a third group, and a taking lens 11_4 of a fourth group in order from an incident-side of subject light A. On the periphery of the taking lens 11_1, a groove 11_1*a* is provided.

Furthermore, the lens assembly 10 includes a lens frame 12 for housing the taking lenses 11_1, 11_2, 11_3, and 11_4. In the lens frame 12, a male screw 12*a* (which corresponds to an example of a first screw) is formed on the outer peripheral surface thereof.

Furthermore, the lens assembly 10 includes an O-ring 13 disposed between the periphery of the taking lens 11_1 and the inner surface of the lens frame 12. Specifically, the O-ring 13 is fitted into the groove 11_1*a*, which is provided on the periphery of the taking lens 11_1. The O-ring 13 is disposed in a state where the O-ring 13 is pressed by the inner surface, corresponding to the groove 11_1*a*, of the lens frame 12. The O-ring 13 is a rubber member which is adapted to exhibit waterproof performance after the taking lens 11_1 is housed in the lens frame 12. Furthermore, a material of the O-ring 13 may be an ethylene propylene based rubber, a silicon rubber, or the like.

Furthermore, the lens assembly 10 includes a lens holder 14. On an inner wall surface of the lens holder 14, there is formed a female screw 14*a* (which corresponds to an example of a second screw) that is screwed with the male screw 12*a* formed on the outer peripheral surface of the lens frame 12. The lens holder 14 deforms the lens frame 12 in such a direction (directions of arrows Q and Q' shown in FIG. 1) as to press the O-ring 13 as it is screwed with the lens frame 12 (as it is screwed in directions of arrows P and P' shown in FIG. 1). Detailed description thereof will be described below.

The lens frame 12 has a wall surface 12*b*. The wall surface 12*b* is located closer, in a direction of the optical axis of the taking lenses 11_1, 11_2, 11_3, and 11_4, to a side where the lens holder 14 is screwed into, than a position where the O-ring 13 is disposed. The wall surface 12*b* extends one step, in a direction perpendicular to the optical axis, toward the optical axis. Furthermore, the lens frame 12 has a deformable portion 12*c* that is located on the O-ring 13 side of the wall surface 12*b*.

Here, when the lens assembly 10 is to be assembled, first, the taking lens 11_4 of the fourth group and the taking lens 11_3 of the third group are sequentially housed in the lens frame 12. Subsequently, the taking lens 11_2 of the second group is housed in the lens frame 12. Then, the O-ring 13 is fitted into the groove 11_1*a*, which is provided on the periphery of the taking lens 11_1 of the first group, and the taking lens 11_1 is housed in the lens frame 12. Furthermore, the anterior end of the lens frame 12 is bent by thermal caulking, to thereby hold the taking lens 11_1 of the first group.

Subsequently, the lens holder 14 is screwed into the lens frame 12. Specifically, the male screw 12*a* of the lens frame 12 is gradually screwed into the female screw 14*a* of the lens holder 14. First, the anterior surface 14*b* of the lens holder 14 in the screwing direction (the directions of arrows P and P') comes into contact with the wall surface 12*b* of the lens frame 12. Next, the lens holder 14 is further screwed into the lens frame 12. Then, the anterior surface 14*b* of the lens holder 14 presses the wall surface 12*b* of the lens frame 12 in the directions of arrows P and P'. Thereby, the deformable portion 12*c* of the lens frame 12 located on the O-ring 13 side of the wall surface 12*b* is deformed in such the direction (the directions of arrows Q and Q') as to press the O-ring 13. That is, an inner diameter portion, corresponding to the O-ring 13, of the lens frame 12 is deformed in such a direction as to decrease the inner diameter thereof.

As described above, in the lens assemble 10 according to the first embodiment, as the female screw 14*a* formed on the inner wall surface of the lens holder 14 is screwed into the male screw 12*a* formed on the outer peripheral surface of the lens frame 12, the deformable portion 12*c* of the lens frame 12 is deformed in such the direction as to press the O-ring 13. Specifically, the anterior surface 14*b* of the lens holder 14 presses the wall surface 12*b* of the lens frame 12, thereby deforming the deformable portion 12*c* of the lens frame 12 in such the direction as to press the O-ring 13. Thereby, the O-ring 13 is sufficiently pressed, and the lens frame 12 is fixed at a sufficient strength on the periphery of the taking lens 11_1. Hence, even if variation occurs in a mounting strength between the taking lens 11_1 and the lens frame 12 in the assembling process of the lens assembly 10, the O-ring 13 is sufficiently pressed by the deformable portion 12*c* of the lens frame 12 by screwing the lens holder 14 into the lens frame 12, and the lens frame 12 is fixed at a sufficient strength on the periphery of the taking lens 11_1. Accordingly, it is possible to assemble the lens assembly 10 improved in waterproof performance. Furthermore, in the case where the assembled lens assembly 10 is mounted on an on-board camera, even if dimensions of the taking lens 11_1 and the lens frame 12 are varied with time, due to change of environmental conditions such as humidity and temperature, or the like, the O-ring 13 is sufficiently pressed by the deformable portion 12*c*, which has been deformed by screwing the lens holder 14. Thus, it is possible to maintain excellent waterproof performance.

Figure 2:
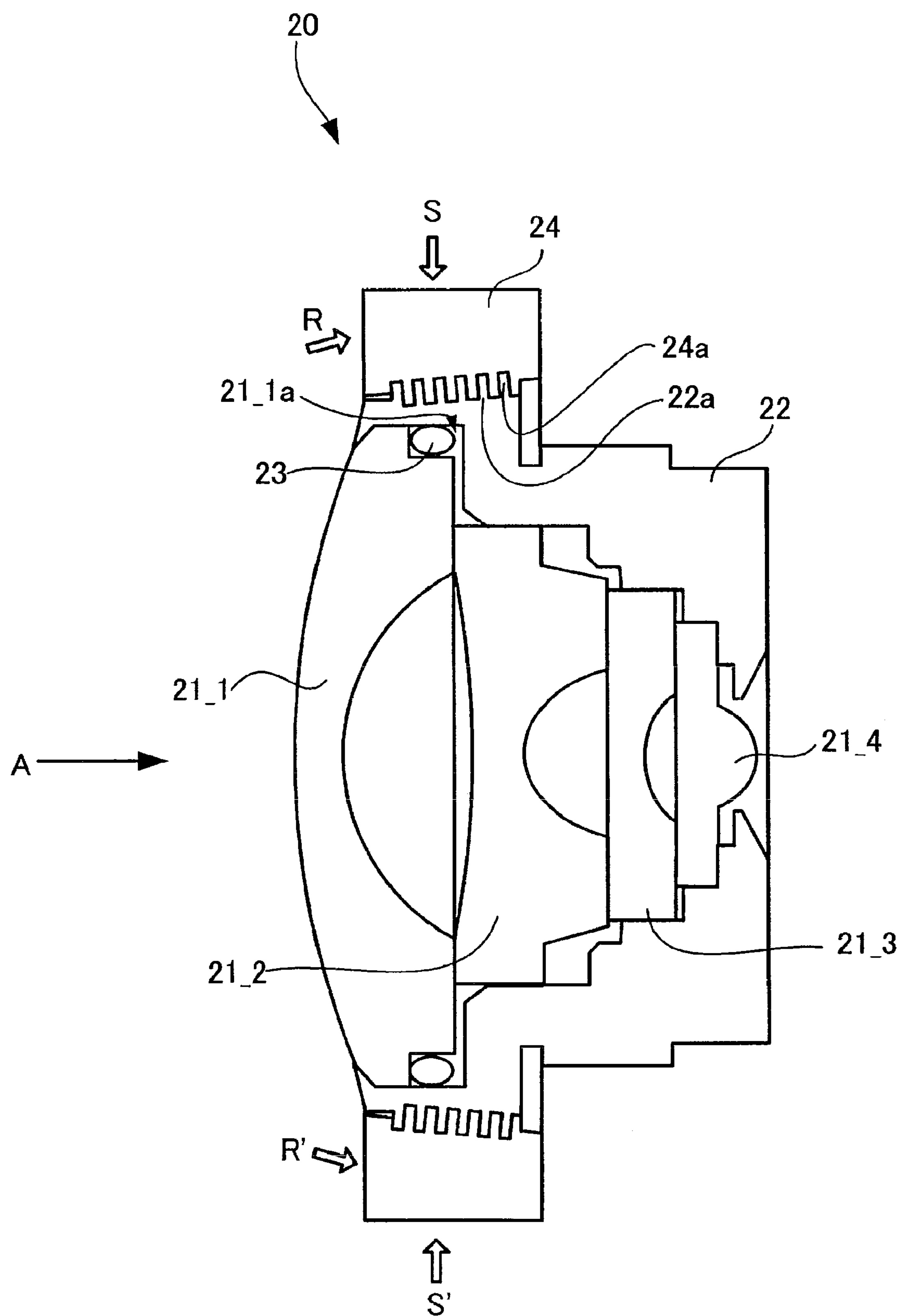
FIG. 2 is a view illustrating a section of a lens assembly according to a second embodiment of the invention, taken along an optical axis of a taking lens.

FIG. 2 is a view illustrating a section of a lens assembly according to a second embodiment of the invention, taken along an optical axis of a taking lens.

A lens assembly 20 according to the second embodiment shown in FIG. 2 includes a taking lens 21_1 of a first group, a taking lens 21_2 of a second group, a taking lens 21_3 of a third group, and a taking lens 21_4 of a fourth group in order from the incident side of subject light A. On the periphery of the taking lens 21_1, a groove 21_1*a* is provided.

Furthermore, the lens assembly 20 includes a lens frame 22 for housing the taking lenses 21_1, 21_2, 21_3, and 21_4. Specifically, a male screw 22*a* (which corresponds to another example of the first screw) is formed on the outer peripheral surface of the lens frame 22 and in an area that is overlapped, in the direction orthogonal to the optical axis of the taking lenses 21_1, 21_2, 21_3, and 21_4, with a position where an O-ring 23 is disposed.

Furthermore, the lens assembly 20 includes the O-ring 23 disposed between the periphery of the taking lens 21_1 and the inner surface of the lens frame 22. Specifically, the O-ring 23 is fitted into the groove 21_1*a*, which is provided on the periphery of the taking lens 21_1. The O-ring 23 is disposed so as to be pressed by the inner surface, corresponding to the groove 21_1*a*, of the lens frame 22. The O-ring 23 is a rubber member that is adapted to exhibit waterproof performance after the taking lens 21_1 is housed in the lens frame 22. Furthermore, a material of the O-ring 23 may be an ethylene propylene based rubber, a silicon rubber, or the like.

Furthermore, the lens assembly 20 includes a lens holder 24. As shown in FIG. 2, the lens holder 24 is a member formed so that its thickness is smaller on the right side than on the left side. The lens holder 24 is formed with a female screw 24*a* (which corresponds to another example of the second screw) having a first taper shape. The female screw 24*a* is adapted to be screwed with the male screw 22*a* from the incidence side of the subject light A. The female screw 24*a* deforms the lens frame 22 in such a direction (directions of arrow S and S') as to press the O-ring 23 as it is screwed into the male screw 22*a* (as it is screwed in directions of arrows R and R' shown in FIG. 2).

Here, when the lens assembly 20 is to be assembled, first, the taking lens 21_4 of the fourth group and the taking lens 21_3 of the third group are sequentially housed in the lens frame 22. Subsequently, the taking lens 21_2 of the second group is housed in the lens frame 22. Then, the O-ring 23 is fitted into the groove 21_1*a*, which is provided on the periphery of the taking lens 21_1 of the first group, and the taking lens 21_1 is housed in the lens frame 22. Furthermore, the anterior end of the lens frame 22 is bent by thermal caulking, thereby holding the taking lens 21_1 of the first group.

Subsequently, the lens holder 24 is screwed into the lens frame 22. Specifically, from the incidence side of the subject light A, the female screw 24*a* of the lens holder 24 is gradually screwed into the male screw 22*a* of the lens frame 22. In the lens holder 24, the female screw 24*a* is formed in the first taper shape. Thus, as the female screw 24*a* is screwed in the directions of the arrows R and R', the lens frame 22 is gradually deformed in such the directions (the directions of arrow S and S') as to press the O-ring 23. That is, an inner diameter portion, corresponding to the O-ring 23, of the lens frame 22 is deformed in such a direction as to decrease the inner diameter thereof.

As described above, in the lens assemble 20 according to the second embodiment, the female screw 24*a* having the first taper shape is formed in the lens holder 24, and as the female screw 24*a* is screwed into the male screw 22*a* formed on the outer peripheral surface of the lens frame 22 (as it is screwed in the directions of arrows R and R'), the inner diameter portion, corresponding to the O-ring 23, of the lens frame 22 is deformed in such the direction as to press the O-ring 23. Thereby, the O-ring 23 is sufficiently pressed, and the lens frame 22 is fixed at a sufficient strength on the periphery of the taking lens 21_1. Accordingly, even if variation occurs in a mounting strength between the taking lens 21_1 and the lens frame 22 in the assembling process of the lens assembly 20, the O-ring 23 is sufficiently pressed by the lens frame 22 by screwing the female screw 24*a*, which has the first taper shape and is formed in the lens holder 24 into the male screw 22*a* of the lens frame 22, and the lens frame 22 is fixed at a sufficient strength on the periphery of the taking lens 21_1. Accordingly, it is possible to assemble the lens assembly 20 improved in waterproof performance. Furthermore, in the case where the assembled lens assembly 20 is mounted on an on-board camera, even if dimensions of the taking lens 21_1 and the lens frame 22 are varied with time, due to change of environmental conditions such as humidity and temperature, or the like, the O-ring 23 is sufficiently pressed by the lens frame 22, which has been deformed by screwing the lens holder 24. Thus, it is possible to maintain excellent waterproof performance.

Figure 3:
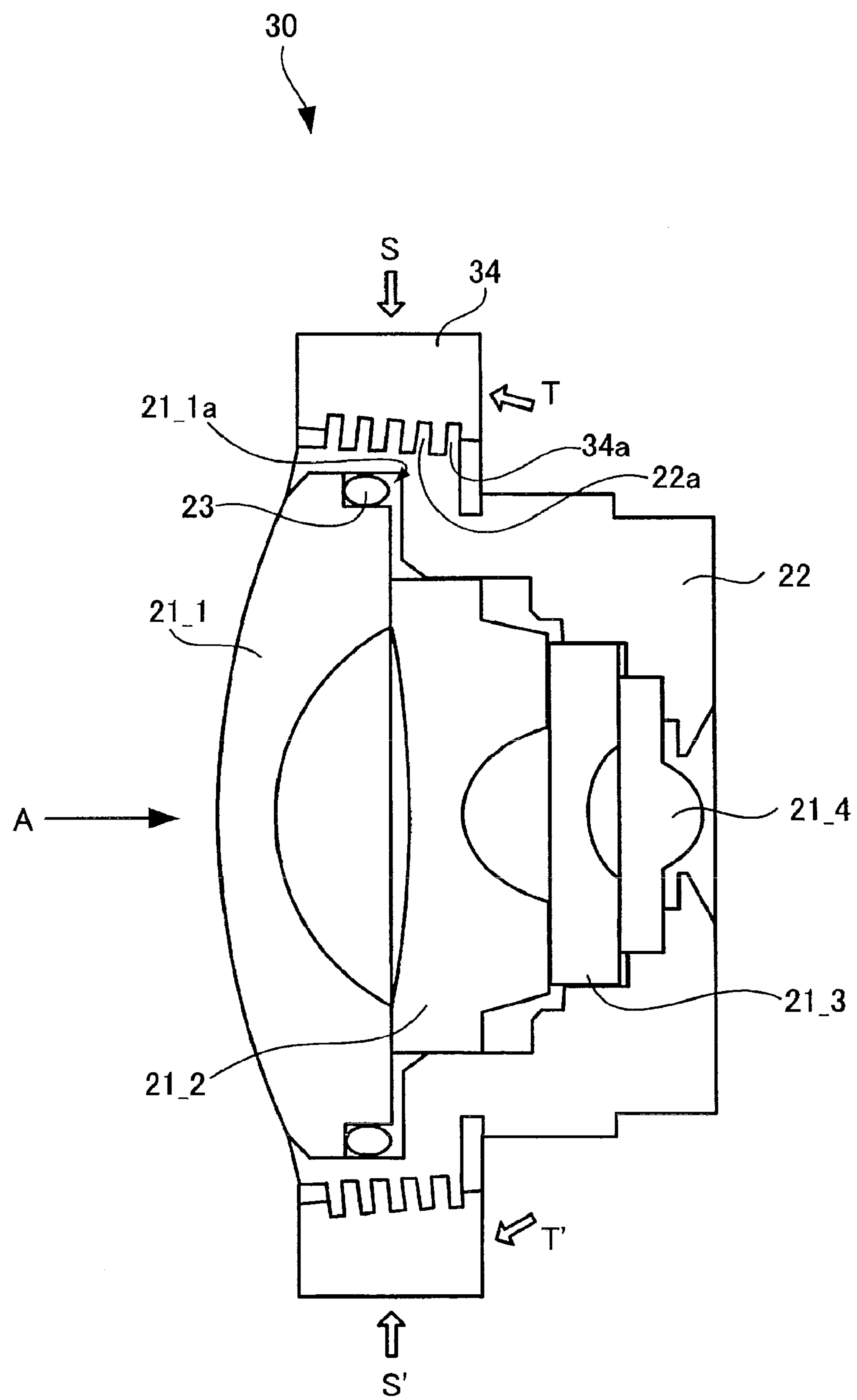
FIG. 3 is a view illustrating a section of a lens assembly according to a third embodiment of the invention, taken along an optical axis of a taking lens.

FIG. 3 is a view illustrating a section of a lens assembly according to a third embodiment of the invention, taken along an optical axis of a taking lens.

Furthermore, in the following description, elements the same as those of the lens assembly 20 shown in FIG. 2 will be referenced by the same reference numerals and signs. Differences between the third embodiment and the second embodiment will be described below.

As compared with the lens assembly 20 shown in FIG. 2, the lens assembly 30 according to the third embodiment shown in FIG. 3 is different in that the lens holder 24 is replaced with a lens holder 34.

As shown in FIG. 3, the lens holder 34 is a member formed so that its thickness is larger on the right side than on the left side. In the lens holder 34, a female screw 34*a* (which corresponds to another example of the second screw described) has a second taper shape and is adapted to be screwed with the male screw 22*a* from a side opposite to the incidence side of the subject light A. The female screw 34*a* is adapted to deform the lens frame 22 in such a direction (directions of arrow S and S') as to press the O-ring 23 as it is screwed into the male screw 22*a* (as it is screwed in directions of arrows T and T' shown in FIG. 3).

Here, when the lens assembly 30 is to be assembled, the taking lens 21_4 of the fourth group, the taking lens 21_3 of the third group, and the taking lens 21_2 of the second group are sequentially housed in the lens frame 22. Then, the O-ring 23 is fitted into the groove 21_1*a*, which is provided on the periphery of the taking lens 21_1 of the first group, and the taking lens 21_1 is housed in the lens frame 22. Furthermore, the anterior end of the lens frame 22 is bent by thermal caulking, thereby holding the taking lens 21_1 of the first group. Subsequently, the lens holder 34 is screwed into the lens frame 22. Specifically, from the side opposite to the incidence side of the subject light A, the female screw 34*a* of the lens holder 34 is gradually screwed into the male screw 22*a* of the lens frame 22. In the lens holder 34, the female screw 34*a* is formed in the second taper shape. Thus, as the female screw 34*a* is screwed in the directions of the arrows T and T', the lens frame 22 is gradually deformed in such the direction (the directions of arrow S and S') as to press the O-ring 23. That is, an inner diameter portion, corresponding to the O-ring 23, of the lens frame 22 is deformed in such a direction as to decrease the inner diameter thereof.

As described above, in the lens assemble 30 according to the third embodiment, the female screw 34*a* having the second taper shape is formed in the lens holder 34, and as the female screw 34*a* is screwed into the male screw 22*a* formed on the outer peripheral surface of the lens frame 22 (as it is screwed in the directions of arrows T and T'), the inner diameter portion, corresponding to the O-ring 23, of the lens frame 22 is deformed in such the direction as to press the O-ring 23. Thereby, the O-ring 23 is pressed, and the lens frame 22 is fixed at a sufficient strength on the periphery of the taking lens 21_1. Accordingly, even if variation occurs in a mounting strength between the taking lens 21_1 and the lens frame 22 in the assembling process of the lens assembly 30, the O-ring 23 is sufficiently pressed by the lens frame 22 by screwing the female screw 34*a*, which has the second taper shape and is formed in the lens holder 34, into the male screw 22*a* of the lens frame 22, and the lens frame 22 is fixed at a sufficient strength on the periphery of the taking lens 21_1. Accordingly, it is possible to assemble the lens assembly 30 improved in waterproof performance. Furthermore, in the case where the assembled lens assembly 30 is mounted on an on-board camera, even if dimensions of the taking lens 21_1 and the lens frame 22 are varied with time, due to change of environmental conditions such as humidity and temperature, or the like, the O-ring 23 is sufficiently pressed by the lens frame 22 which has been deformed by screwing the lens holder 34. Thus, it is possible to maintain excellent waterproof performance.

Figure 4:
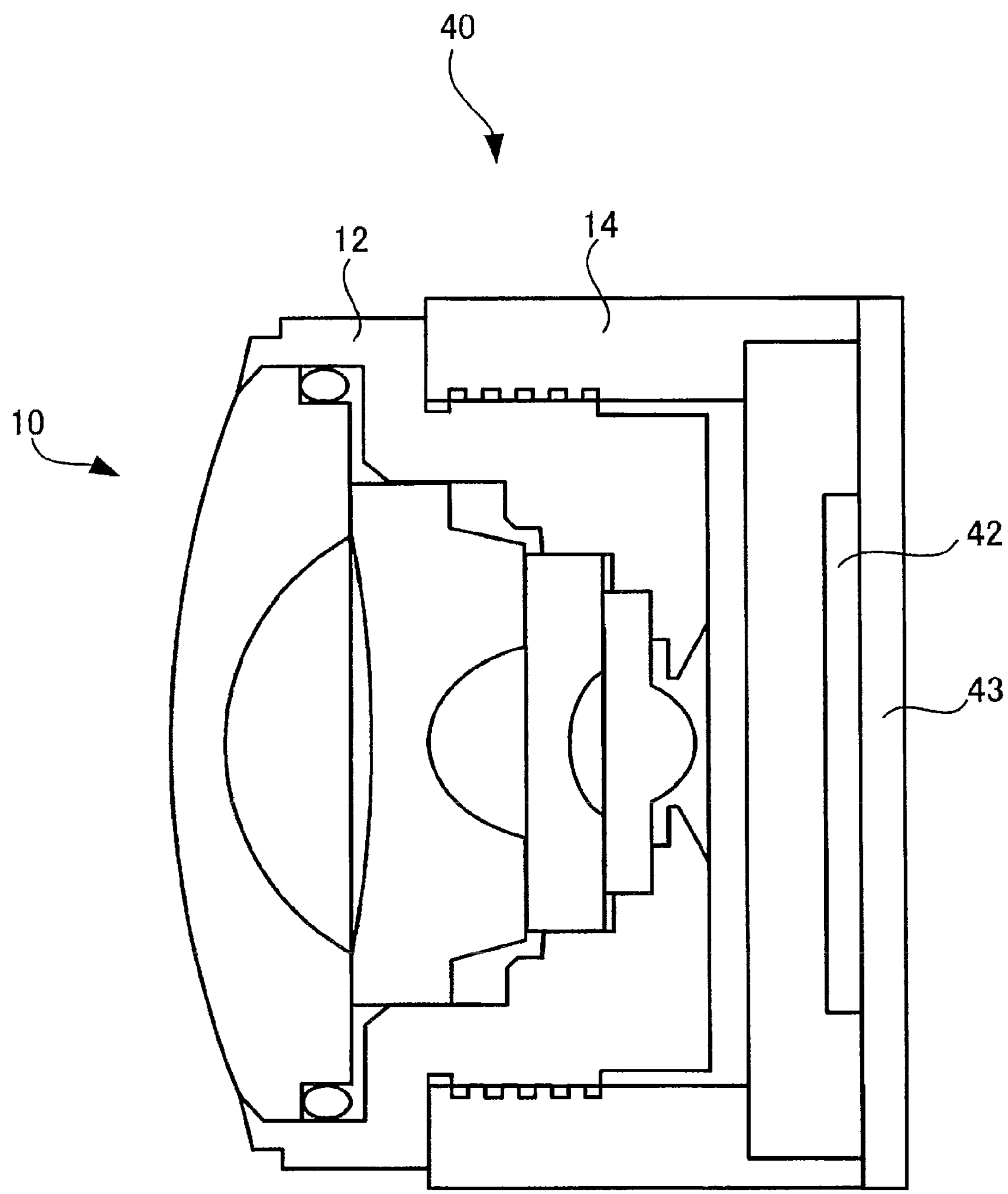
FIG. 4 is a view illustrating a section of a camera unit having the lens assembly shown in FIG. 1, take along the optical axis of the taking lens.
Figure 5:
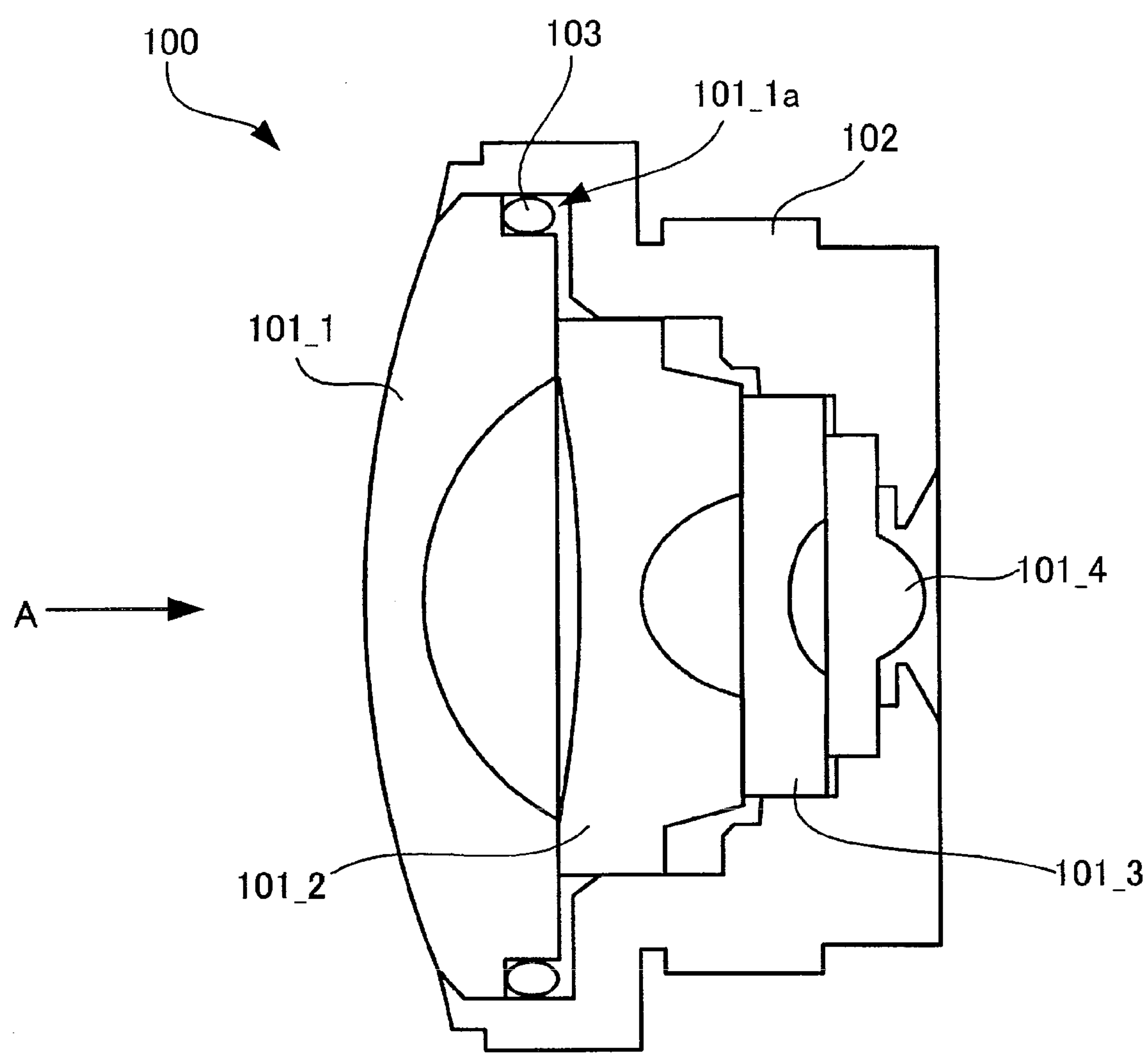
FIG. 5 is a view illustrating a section of a related-art lens assembly, taken along an optical axis of a taking lens.

FIG. 4 is a view illustrating a section of a camera unit having the lens assembly shown in FIG. 1, taken along the optical axis of the taking lens.

The camera unit 40 shown in FIG. 4 is an imaging apparatus according to one embodiment of the invention. The camera unit 40 includes the lens assembly 10 shown in FIG. 1, a camera main frame that is also used as the lens holder 14, an imaging device 42, and a substrate 43.

To assemble the camera unit 40, the substrate 43 provided with the imaging device 42 such as CCD is fixedly adhered to the rear of the lens holder 14. Also, an adhesive is coated between an outer periphery of the lens frame 12 and an anterior end of the lens holder 14. Thereby, a waterproof treatment is performed so that water is prevented from entering into the camera unit 40 from the anterior end side thereof. In this manner, the camera unit 40 is assembled. Hence, a waterproof performance of the camera unit 40 is improved.

What is claimed is:

1. A lens assembly comprising:

a lens;

a lens frame that houses the lens and is formed with a first screw on an outer peripheral surface thereof;

an O-ring that is disposed between a periphery of the lens and an inner surface of the lens frame; and a lens holder that is formed with a second screw on an inner wall surface thereof, wherein the second screw is screwed with the first screw, and the lens holder deforms the lens frame in such a direction as to press the O-ring, as the second screw of the lens holder is screwed with the first screw of the lens frame.

2. The lens assembly according to claim 1, wherein the lens frame includes a wall surface that is located closer, in a direction of an optical axis of the lens, to a side where the second screw of the lens holder is screwed into than a position where the O-ring is disposed, the wall surface extending one step, in a direction orthogonal to the optical axis, toward the optical axis, and when the second screw of the lens holder is screwed in the first screw of the lens frame, an anterior surface of the lens holder in a screwing direction presses the wall surface to deform, in such the direction as to press the O-ring, a part of the lens frame closer to the O-ring than the wall surface.

3. The lens assembly according to claim 1, wherein the first screw is formed on the outer peripheral surface of the lens frame and in an area that is overlapped, in a direction orthogonal to an optical axis of the lens, with a position where the O-ring is disposed, and the lens holder is formed with the second screw, which is screwed with the first screw and which is formed in a taper shape to deform the lens frame in such the direction as to press the O-ring as the second screw is screwed into the first screw.

4. An imaging apparatus comprising:

the lens assembly according to claim 1; and an imaging device.

5. An imaging apparatus comprising:

the lens assembly according to claim 2; and an imaging device.

6. An imaging apparatus comprising:

the lens assembly according to claim 3; and an imaging device.

* * * * *